Oct. 25, 1960 F. B. STENCEL 2,957,664
FAST-ACTING PARACHUTES
Filed Feb. 28, 1958 7 Sheets-Sheet 1
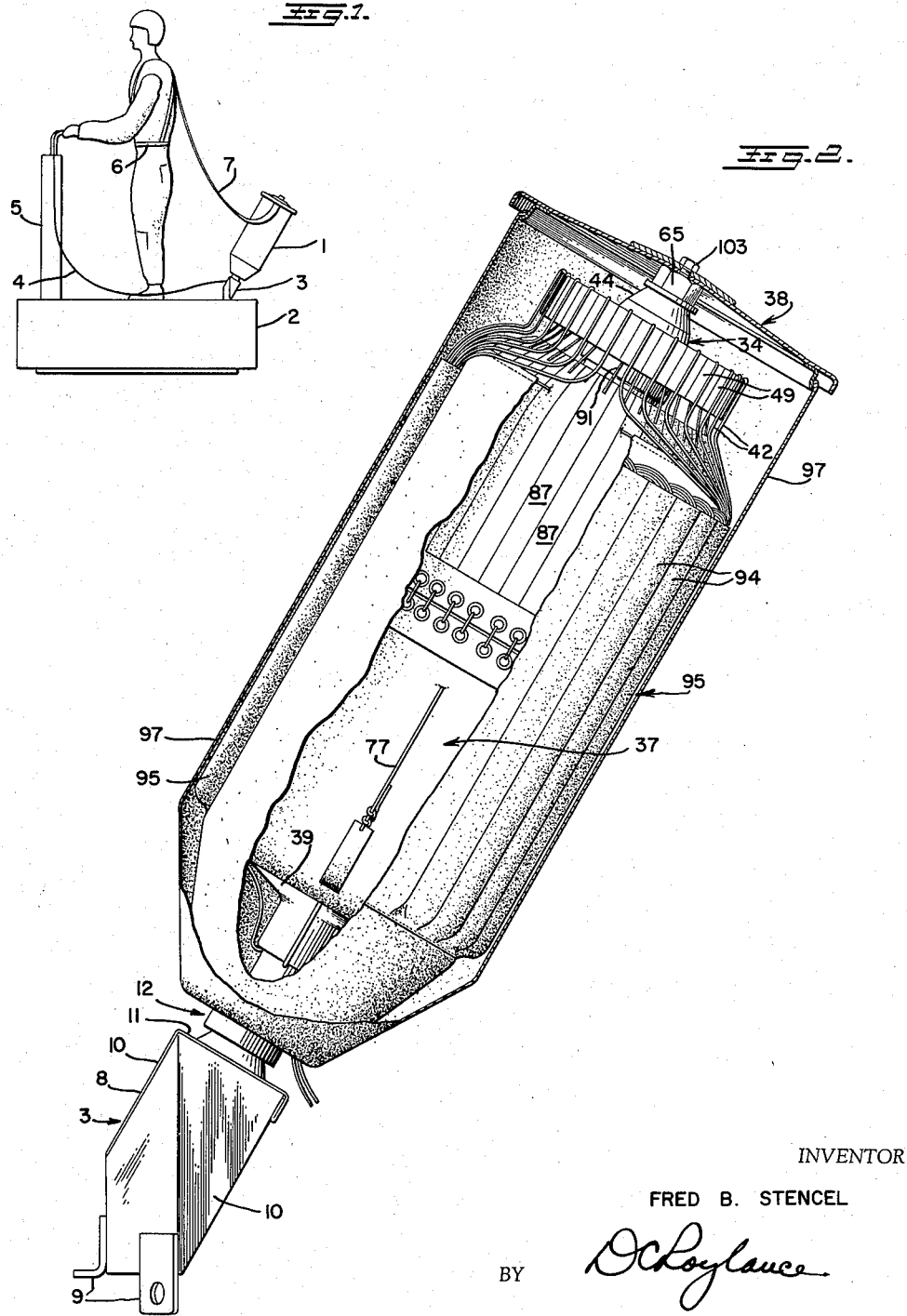
INVENTOR
FRED B. STENCEL
BY
ATTORNEY Oct. 25, 1960 F. B. STENCEL 2,957,664
FAST-ACTING PARACHUTES
Filed Feb. 28, 1958 7 Sheets-Sheet 2

INVENTOR
FRED B. STENCEL
BY DCRoylance
ATTORNEY

Oct. 25, 1960  F. B. STENCEL  2,957,664
FAST-ACTING PARACHUTES
Filed Feb. 28, 1958  7 Sheets-Sheet 4

INVENTOR
FRED B. STENCEL

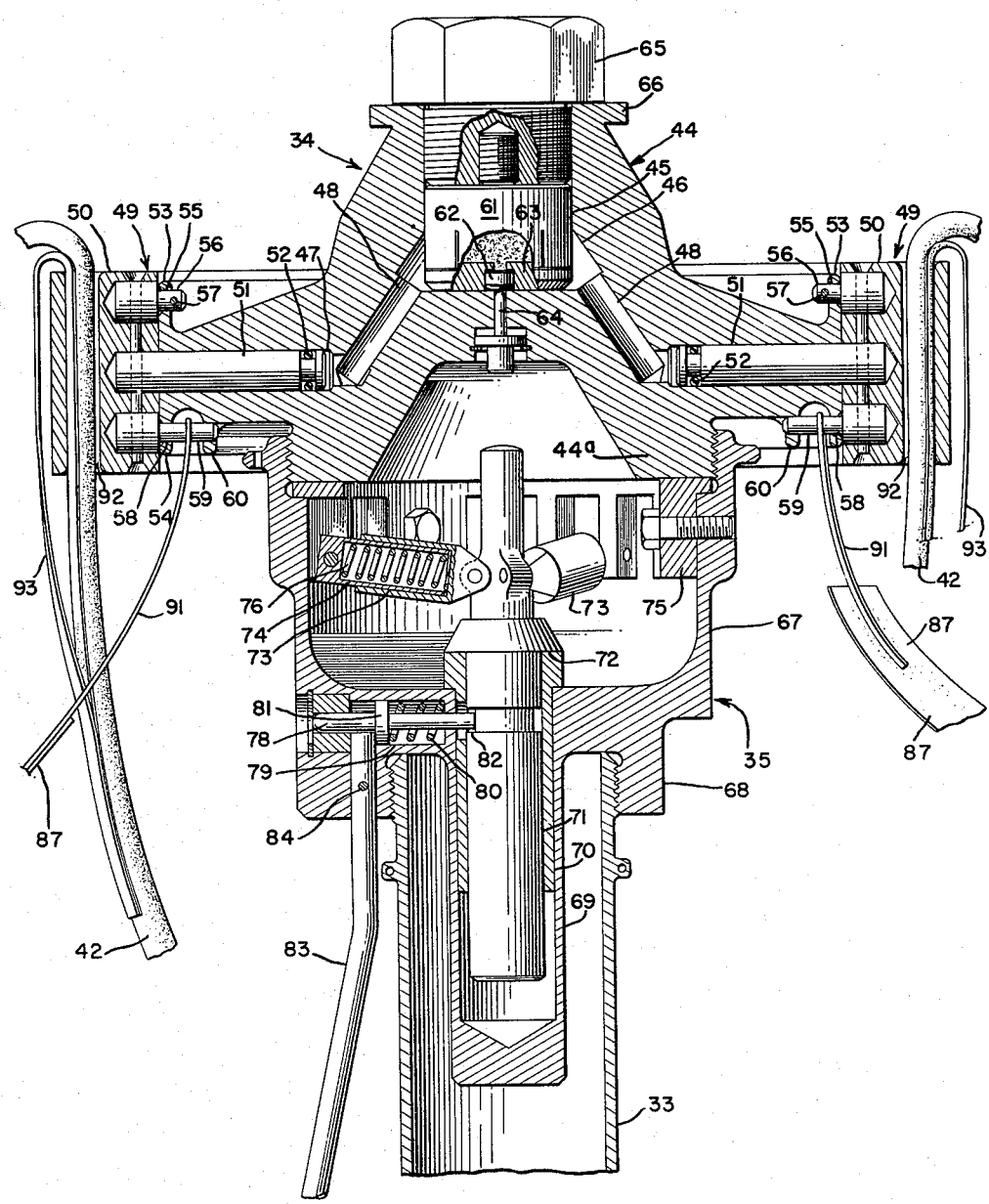

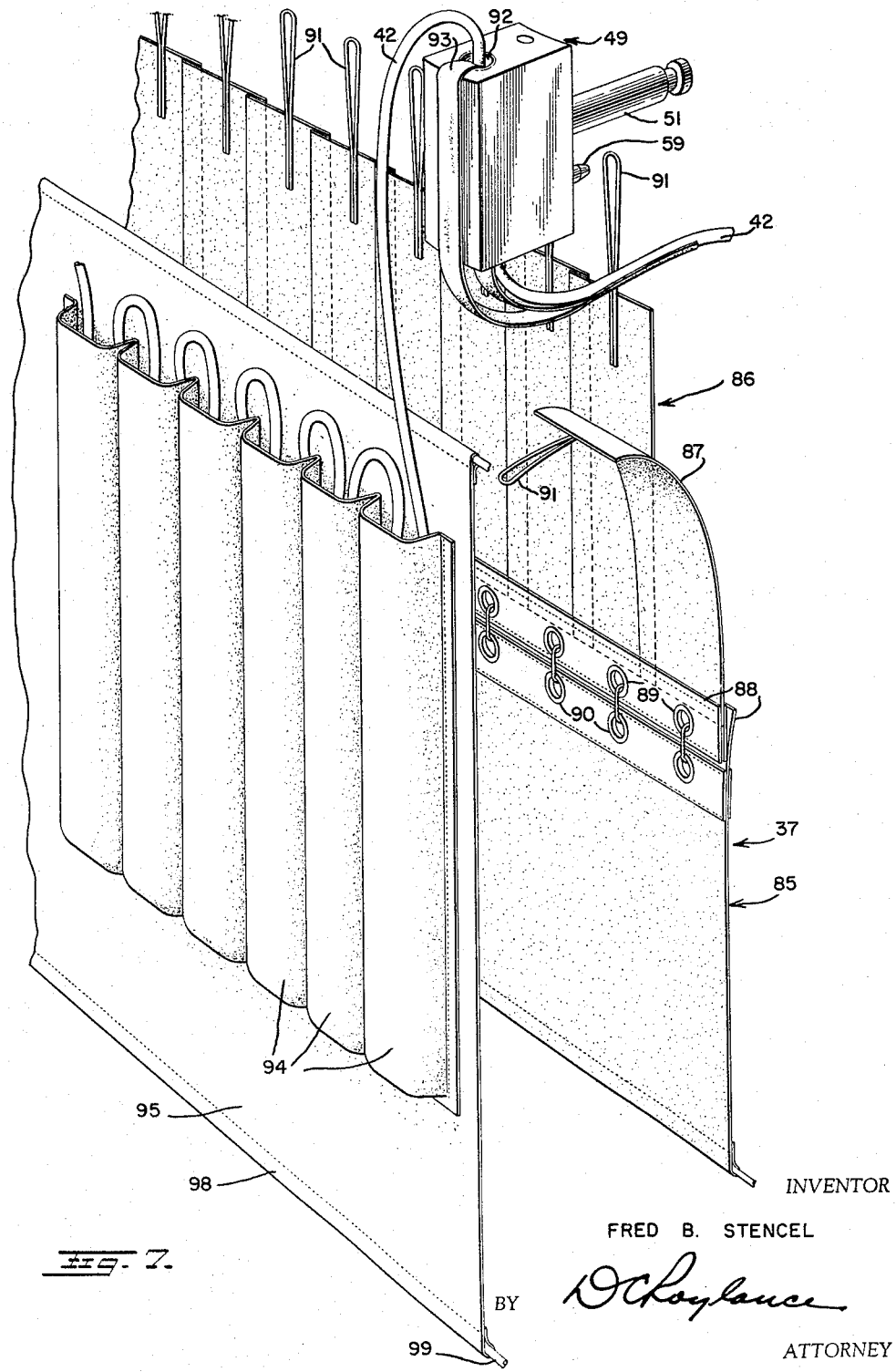

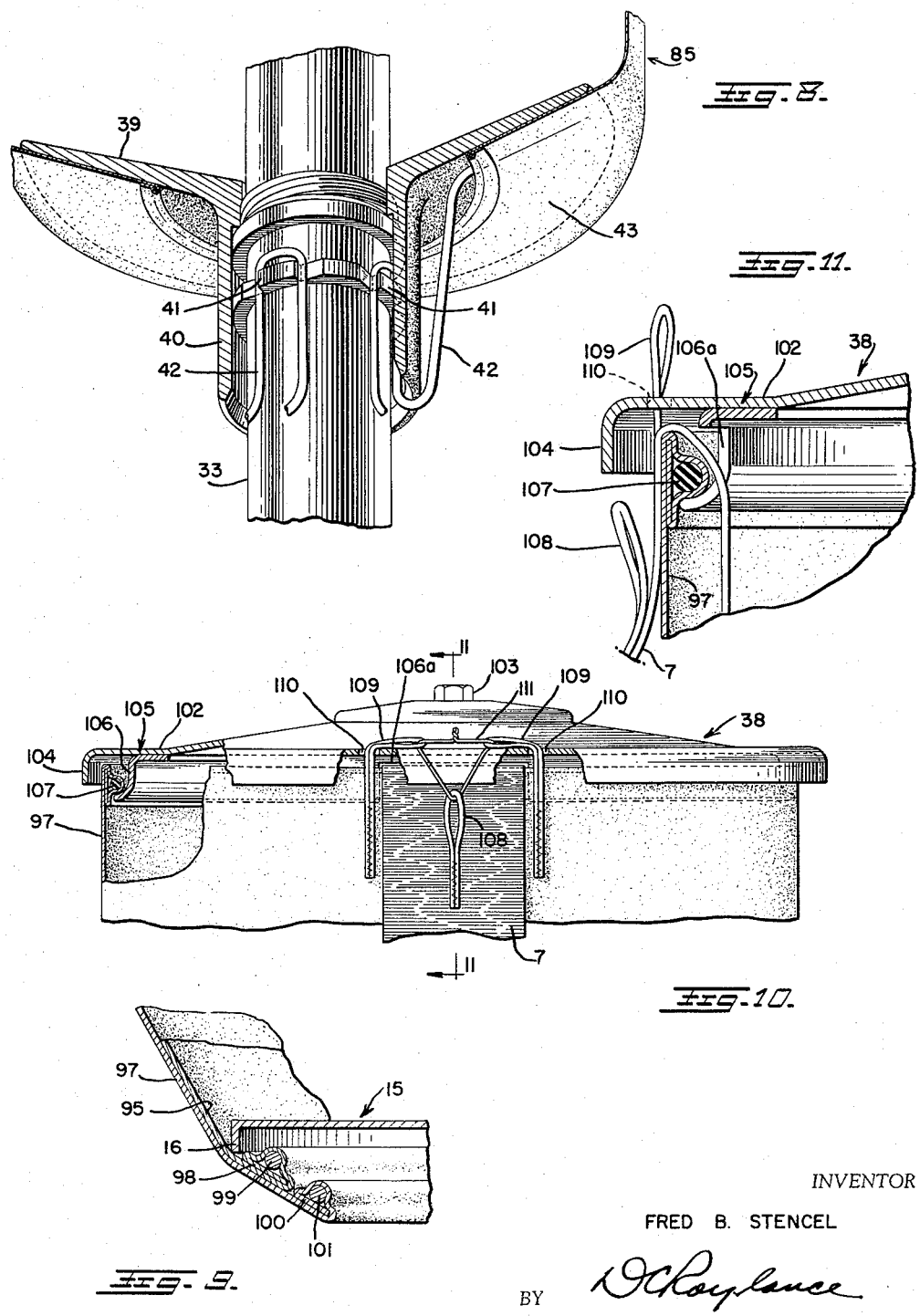

United States Patent Office 2,957,664
Patented Oct. 25, 1960

2,957,664

FAST-ACTING PARACHUTES

Fred B. Stencel, Asheville, N.C., assignor to Amcel Propulsion, Inc.

Filed Feb. 28, 1958, Ser. No. 718,362

22 Claims. (Cl. 244—147)

This invention relates to parachutes and more particularly to a novel ballistic parachute, that is, a parachute which is explosively projected and deployed. The present invention bases certain improvements over that disclosed and claimed in my copending application Serial Number 581,535, filed April 30, 1956.

An object of the present invention is to provide an explosively projected and explosively deployed parachute which is extremely fast in its projection and deploying action and is of improved dependability in operation.

Another object is to provide such a parachute having features which assure that the projected parachute assembly will be in a predetermined position or attitude at the time of deployment of the parachute canopy.

A further object is to provide a parachute of the type referred to wherein the parachute canopy is very quickly withdrawn from its container, substantially without interference to such withdrawal, at the time of deployment.

A still further object is to provide an explosively projected and deployed parachute characterized by use of arresting line means to decelerate the projected parachute assembly after a given amount of travel, cooperating mechanisms being employed to accomplish deployment of the parachute in response to such deceleration.

Another object is to provide, in a parachute of the type just mentioned, a novel means for storing the arresting and suspension lines, such means allowing said lines to pay out freely as the projected assembly travels upwardly before the deployment operation.

Yet another object is to provide an extremely compact and mechanically simple parachute assembly which is more advantageously adapted for explosive projection, at relatively high speeds, than has heretofore been possible.

A further object is to provide such a parachute which is of extremely light weight, yet capable of attaining high projection and deployment speeds.

Yet a further object is to devise a parachute of the type described in which the components are recoverable with the canopy after use of the parachute.

In order that the manner in which these and other objects are attained in accordance with the invention can be understood in detail, reference is had to the accompanying drawings, which form a part of this specification and wherein:

Fig. 1 is a diagrammatic elevational view illustrating the manner in which a parachute constructed in accordance with one embodiment of the invention is applied to recover personnel from a so-called flying platform;

Fig. 2 is an elevational view, larger in scale than Fig. 1, of a parachute assembly constructed in accordance with the invention, some parts thereof being shown in vertical section and broken away for clarity;

Fig. 6 is an enlarged vertical sectional view illustrating the deployment means, and its actuator, of the embodiment seen in Figs. 1–3;

Fig. 7 is a perspective, developed view of portions of the canopy bag and line storage sleeve employed in the embodiment of Figs. 1–3;

Fig. 8 is an enlarged detail in perspective, partly in vertical section, illustrating one manner in which the apex of the parachute canopy is attached to the supporting tube of the projected assembly in accordance with the invention;

Fig. 9 is an enlarged fragmentary view, partly in elevation and partly in vertical section, illustrating one manner in which the outer bag and the line storage sleeve are secured to the mount in accordance with the invention;

Fig. 10 is an enlarged detail view, in elevation and with some parts broken away and others in vertical section, of the top cover assembly of the embodiment illustrated in Figs. 1–3, and Fig. 11 is a detail sectional view, larger in scale than Fig. 9, taken on line 11—11, Fig. 10.

Typical application

Figure 3:
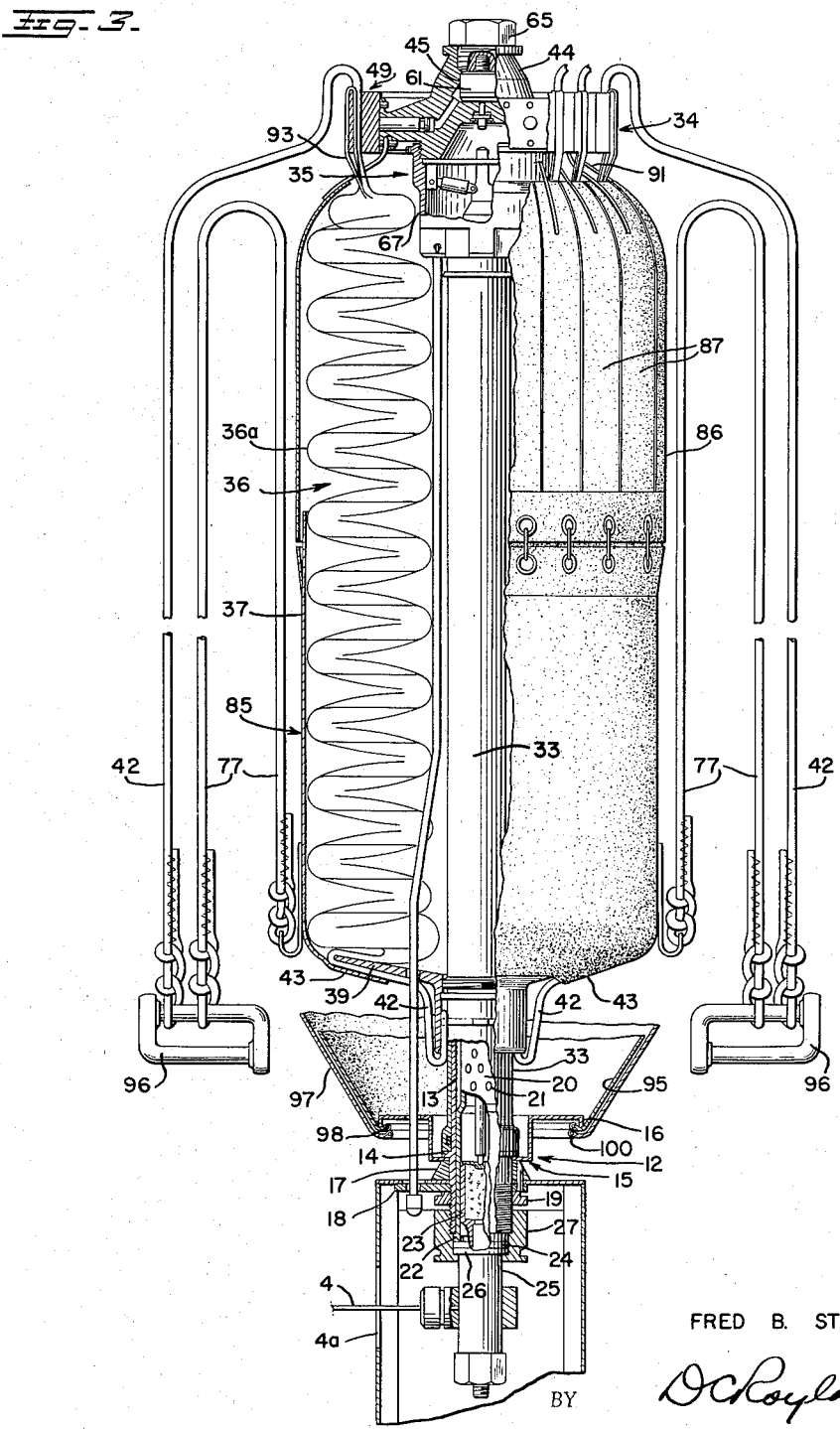
Fig. 3 is a vertical sectional view, still further enlarged, of the assembly of Fig. 2, with some parts shown in elevation.

Fig. 1 illustrates a typical application of the ballistic parachute of the present invention to the recovery of personnel from a flying platform. In the case of aerial vehicles of this type, it will be understood that the craft is frequently operated at very low altitudes and low speeds, even at zero speed, so that a power failure or other malfunction can result in the craft falling to the ground so quickly that a conventional parachute could not be operated. Such applications thus require a parachute construction which can be projected upwardly, away from load to be supported, and then substantially instantaneously deployed, so that substantially no free fall period is required to fill the parachute canopy.

As seen in Fig. 1, the parachute assembly indicated generally at 1 is secured to the flying platform 2 by a mount indicated at 3. As will be fully described, the parachute is provided with a manual triggering device including a Bowden wire 4 extending to the control post 5 of the flying platform. The operator of the flying platform wears a conventional harness 6 to which are attached two riser extension straps 7 which extend from the parachute assembly.

The particular application of the invention shown in Fig. 1 is illustrative of those cases where the parachute is mounted on an object, such as the flying platform, other than the body to be recovered which, in this case, is the pilot. It will be understood by those skilled in the art that the present invention is useful for other purposes than recovering the pilot of a flying platform.

Mount and projection unit

As best seen from Fig. 2, the parachute assembly 1 is provided at its lower end with a metal mounting structure 8 which also serves as a housing for projection means later described. The structure 8 is secured directly to the flying platform 2 by brackets 9, the structure 8 being so associated with its mounting brackets that the longitudinal axis thereof extends away from the flying platform at an angle such that the projected parachute will travel away from the pilot who is to be recovered by the parachute. The mount 8 comprises upwardly extending side walls 10 rigidly joined to a transverse top wall 11, Fig. 2. Top wall 11 is provided with a centrally disposed circular opening through which the projection assembly indicated generally at 12 extends upwardly from within the mounting structure. The projection assembly includes a generally cylindrical projection tube 13 which extends for a substantial distance upwardly from the wall 11 and is provided, at a point near the wall 11, with a transverse, annular, outwardly directed flange 14. Beneath flange 14 is engaged a retaining ring 15 of sheet metal having at its periphery a dependent flange 16. Between the central portion of ring 15 and wall 11 is a spacing element 17.

Figure 4:
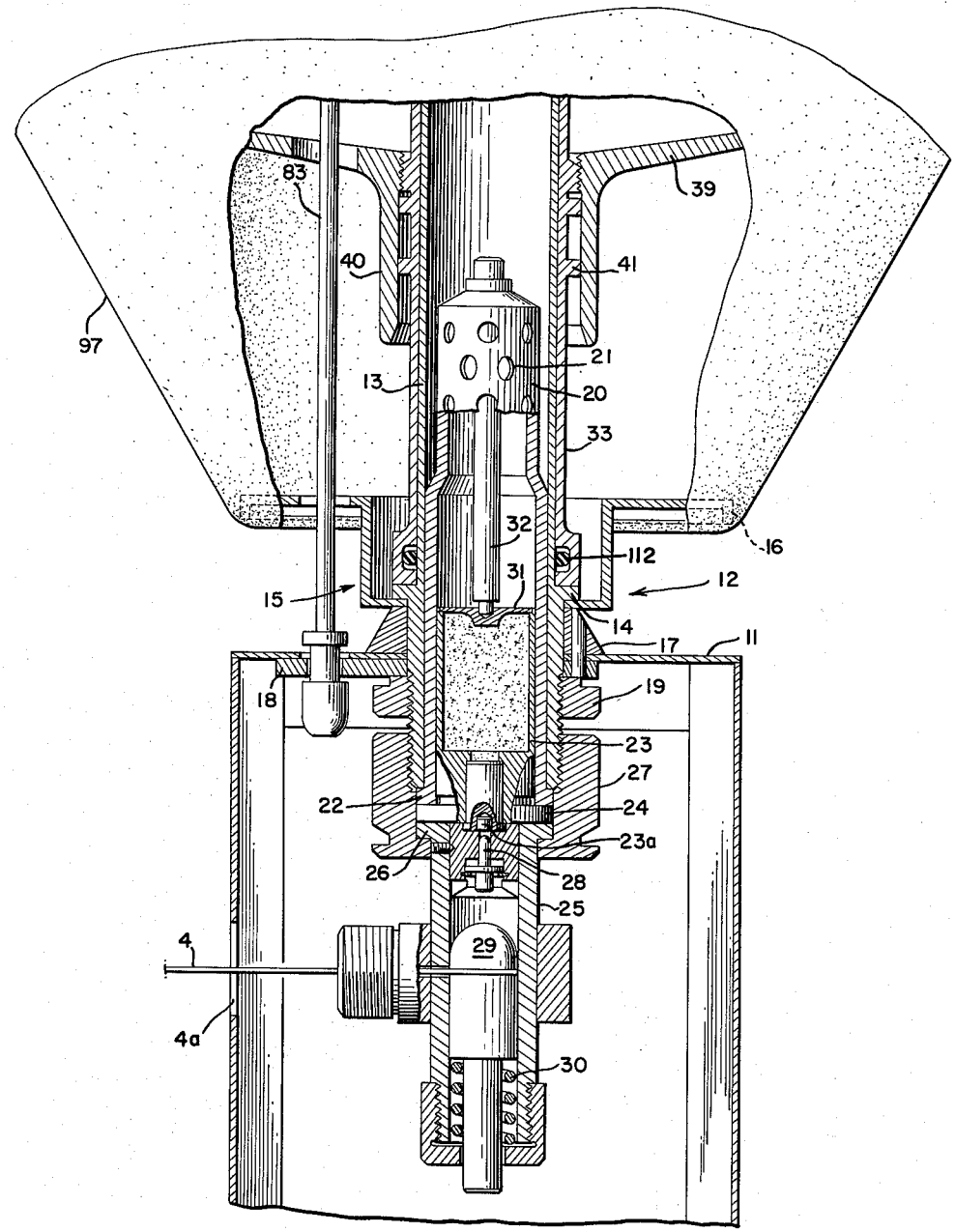
Fig. 4 is an enlarged view in vertical section, with some parts shown in elevation, illustrating the projection means of the invention.

Beneath top wall 11 of mount 8 is a latch plate 18 held against the top wall by a lock nut 19 threaded to projection tube 13. Extending upwardly into the bottom portion of the projection tube 13 is a combustion chamber 20 of generally cylindrical form, the upper end portion thereof being perforated as indicated at 21, and the lower end thereof being provided with an outwardly directed end flange 22 the upper edge of which is seated against the bottom end of the projection tube 13. A cylindrical projection charge container 23 is disposed within the bottom end portion of combustion chamber 20 and has an outwardly directed bottom end flange 24 abutting the bottom end of combustion chamber 20. A cylindrical actuator sleeve 25 is provided with an upper end flange 26 seated against the lower surface of flange 24, the sleeve 25 being held in place by a cap nut 27 which engages the lower edge of flange 26 and is threaded to the bottom end of the projection tube 13. As best seen in Fig. 4, the actuator sleeve 25 contains a firing pin 28 operatively disposed with respect to the primer of charge 23. Therebelow, the sleeve 25 encloses a firing pin actuator 29 urged toward the firing pin by a spring 30. Before actuation, the firing pin actuator 29 is maintained in a lower position, holding spring 30 in compression, by the tip of the Bowden wire 4, as shown. Bowden wire 4 enters mount 8 via an opening 4a in one side wall thereof.

The main body of the projection charge container 23 is in the form of a cylindrical, sheet metal wall extending upwardly within the combustion chamber 20. The top of container 23 is closed by a circular, deformable metal plate 31 held in position, before ignition of the charge, by a fixed rod 32 secured to the tip of combustion chamber 20. The peripheral portion of plate 31 overlies the upper end of the cylindrical wall of container 23, as shown in Fig. 4. Container 23 is of course completely filled with suitable explosive composition capable of being ignited by explosion of the primer 23a, Fig. 4.

When the operator actuates the Bowden wire 4, so that the tip thereof is withdrawn from actuator 29, spring 30 urges the actuator against the firing pin, exploding the primer and igniting the projection charge. The explosion deforms plate 31 upwardly, so that the explosion gases are delivered within the upper end portion of combustion chamber 20 and escape, via perforations 21, into the interior of the projection tube 13.

*The projected assembly*

As seen in Figs. 3 and 6, the projected assembly comprises a projectile or supporting tube 33, parachute deployment means indicated generally at 34, an inertia operated deployment actuator indicated at 35, the parachute canopy 36, the canopy bag 37 and the top cover assembly 38.

Secured to the projection tube 33 by screw threads at a point near the lower end thereof is a canopy retaining disk 39, Figs. 3 and 8, of dished configuration and provided with a cylindrical, dependent skirt 40 spaced outwardly from the tube 33. As seen in Fig. 8, skirt 40 embraces a plurality of outward projections 41 integral with the tube 33, the projections 41 being four in number, in this embodiment, and spaced at 90° intervals around the tube 33.

The canopy 36 is folded in accordance with my copending application Serial Number 581,764, filed April 30, 1956. That is, the canopy is so folded as to be disposed in a series or stack of generally toroidal folds 36a. The parachute canopy 36 is provided with the usual opening at the apex thereof and tube 33 extends through such opening and through the centers of the generally toroidal folds 36a. As viewed in Fig. 3, the folded canopy is disposed upside down, with the apex adjacent retaining disk 39 and the periphery of the canopy adjacent deployment means 34.

The suspension lines 42 extend entirely across the parachute canopy 36, in the usual fashion, and therefore cross the circular opening at the apex of the canopy. In order to secure projection tube 33 and its associated parts to the canopy, a plurality of the apex portions of the suspension lines are brought outwardly over the periphery of canopy retaining disk 39, thence inwardly between the inturned bottom end portion 43 of canopy bag 37 and the bottom of disk 39, and then downwardly below the bottom of skirt 40 and upwardly to loop over projections 41. Employing a conventionally made canopy with twenty-four suspension lines, and therefore twelve apex line portions, every third apex line portion is looped over a different one of the four projections 41. It will be understood that the apex line portions are looped over the projections 41 in this manner before the retaining disk 39 is threaded into place. Thus, in the completed assembly, skirt 40 retains the apex line loops on projections 41.

*Deployment means*

Figure 5:
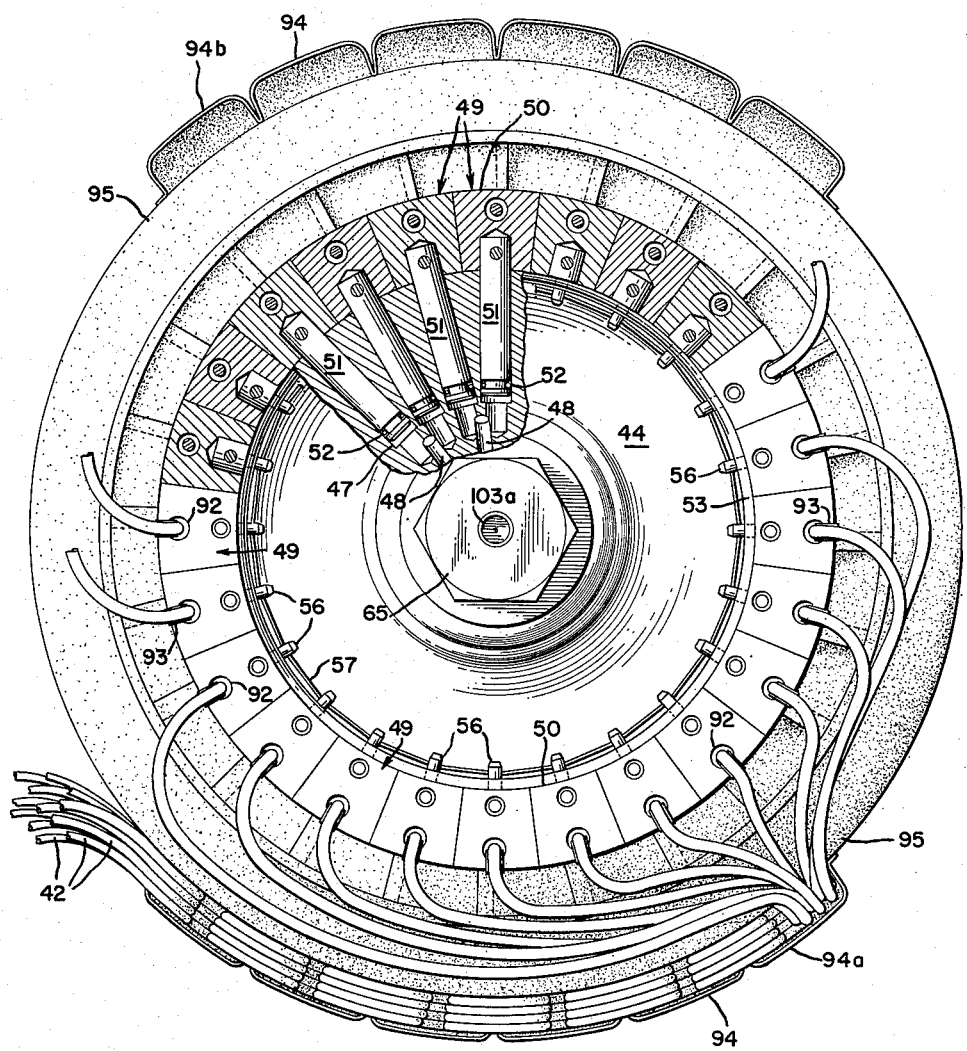
Fig. 5 is an enlarged top plan view, partially in transverse section and with some parts removed and others broken away for clarity, of the assembly shown in Fig. 3.

As best seen in Figs. 5 and 6, the deployment means 34 comprises a main body 44 of aluminum or the like provided with a cylindrical, upwardly opening deployment charge chamber 45 axially aligned with the projection tube 33 and having a downwardly and outwardly flared bottom portion 46. Body 44 is also provided with twenty-four equally spaced, radially directed bores 47 all lying in the same transverse plane at right angles to the axis of tube 33. The body 44 is also provided with 12 downwardly and outwardly slanting ducts 48. Each duct 48 communicates between the lower portion of the charge chamber 45 and the inner ends of two adjacent ones of the bores 47.

Associated with each bore 47 is a deployment projectile 49 comprising a main body 50 and a cylindrical stem 51, the stems each being disposed in a different one of bores 47. At its free end, each stem 51 is provided with a groove in which is retained an O-ring 52 to establish a fluid-type seal between the stem and the wall of the corresponding bore 47.

At its outer periphery, body 44 of the deployment means is provided with aligned upper and lower cylindrical flanges 53 and 54, respectively, these flanges being cylindrical and coaxial with the tube 33. Upper flange 53 has a series of radially directed openings 55, Fig. 6, equal in the number to the bores 47 and aligned thereabove. Each projectile 49 is provided with a pin 56 extending radially inwardly from the main body of the projectile and through one of the openings 55. At its inner end, each pin 56 has a transversely extending bore, and a shear wire 57, Fig. 5, extends through all of such bores in pins 56. Lower flange 54 also is provided with a series of radially directed openings 58 equal in number to bores 47. Each projectile 49 is provided with a lower, inwardly directed pin 59 extending through one of such openings. Dependent from the main body 45 of the deployment means and spaced inwardly of and concentric with the flange 54 is a second flange 60 provided with a series of radially directed openings to accommodate the tips of pins 59.

Nested in deployment charge chamber 45 is a cylindrical deployment charge container 61, Fig. 6, in the form of an inverted cup. The cylindrical walls of container 61 are of thin metal and the container is completely filled with a suitable explosive material capable of being ignited by explosion of the primer 62. The primer 62 is centrally located at the bottom of the charge container, being supported in a bottom closure plate 63 and aligned immediately above a firing pin 64. Chamber 45 is closed, and charge container 61 is retained in place, by a cap screw 65 threaded into the chamber, the tip of the screw directly engaging container 61. Upon actuation of the firing pin, the primer is exploded and the charge ignited. The resulting explosion forces the lower portion of the relatively thin walls of the charge container outwardly against the wall of generally frustoconical lower portion 46 of the charge chamber. Such deformation of the charge container places the expanding explosion gases suddenly in communication with the ducts 48, and thus with the bores 47. The projectiles 49 are accordingly projected radially outward at high speed, being freed by breakage of shear wire 57 at the time of the explosion.

*Deployment actuator means*

Connected to an exteriorly threaded dependent portion 44a, Fig. 6, on main body 44 of deployment means 34 is the upper end of a cup-shaped housing 67. Housing 67 is provided with an annular dependent portion 68 threaded to the upper end of projection tube 33. Immediately above the upper end of tube 33, housing 67 extends inwardly and is there provided with a dependent well 69 which is closed at its bottom end. A cylindrical bushing 70 is secured within well portion 69, extending somewhat thereabove, and slidably embraces a firing pin actuating plunger 71.

Plunger 71 has an outwardly directed annular shoulder 72 engageable with the upper end of bushing 70 when the firing pin actuating plunger 71 is in its inactive position. Above this shoulder, the plunger 71 has an actuating head portion of substantial length aligned with the firing pin 64. Pivoted to such portion of the actuating plunger at circumferentially spaced points are three generally radially directed spring-retaining tubes 73. Each of the tubes 73 telescopically embraces a smaller tube 74 pivoted to a mounting ring 75 having an upper flange portion clamped between housing 67 and dependent boss 66. Each set of telescopically engaged tubes 73, 74 encloses a compression spring 76, Fig. 6.

Fig. 6 illustrates the actuating plunger 71 in its inactive position, with shoulder 72 biased into contact with the top of bushing 70 by reason of the fact that the pivot points for tubes 73 are below the pivot points for tubes 74. After projection of the parachute assembly, and when the arresting lines 77 (later described) become taut, the resulting deceleration will cause the plunger 71 to move upwardly, against the biasing action of springs 76. Such upward movement will continue, because of the force of deceleration. When the pivot points for tubes 73 are just above the pivot points for tubes 74, the energy stored in compression springs 76 will aid the deceleration force, and the plunger 71 will be thrown abruptly against the firing pin 64, so exploding primer 62 and igniting the deployment charge. The springs 76 serve both as safety means, normally biasing the plunger 71 to inactive position, and as means by which the actuating mechanism can be made to explode the primer 62 upon occurrence of a definite, pre-selected deceleration of the parachute.

In order that the deployment charge can not be fired accidently before the parachute is projected away from its mount, or while the assembly is being handled before being mounted, even upon occurrence of such decelerations as would normally actuate plunger 71, latch means released upon projection is provided. This latch means includes a latch plunger 78 slidably disposed in a radially directed bore 79 in housing 67. Plunger 78 is normally urged radially outward, into nonlatching position, by a compression spring 80 acting on the one hand against the inner end of bore 79 and on the other hand against a shoulder 81 on the plunger. Before projection, latch plunger 78 is held engaged in a groove 82 in plunger 71, against the action of spring 80, by a latch rod 83. The latch rod 83 extends, within the annular canopy folds, from the housing 67 downwardly through canopy retaining disk 39 and top wall 11 of mount 8, the lower end of the rod having a shoulder engaged beneath latch plate 18. The upper end of latch rod 83 extends through a vertical bore in dependent portion 68 of housing 67 and engages the outer surface of shoulder 81 on latch plunger 78. The latch rod 83 is temporarily secured in place by a shear pin 84. When the projectile tube 33 and its associated assembly are projected from the mount, the latch rod 83 is retained on the mount by reason of engagement of its lower end with latch plate 18. Accordingly, shear pin 84 is ruptured and the upper end portion of the latch rod is withdrawn from contact with shoulder 81 of the latch plunger. The latch plunger is accordingly urged outwardly by spring 80, so that plunger 71 is now free to operate in response to deceleration of the projected assembly.

*The canopy retainer*

The canopy bag 37 includes a lower, plain portion 85 the bottom end portion 43 of which turns inwardly to lie against the bottom surface of canopy retaining disk 39. At its top, portion 85 of the canopy bag is connected to an expansible upper canopy bag portion 86. Portion 86 is made up of a plurality of overlapping tapes 87, extending upwardly from bag portion 85 toward deployment means 34, as best seen in Figs. 3 and 7, the lower ends of the tapes 87 being secured between strips of fabric 88 provided with spaced eyelets 89. Connection between lower bag portion 85 and upper bag portion 86 is accomplished by a lacing extending between eyelets 89 and similar eyelets 90 provided in a series along the top of the lower bag portion. At their upper ends, the tapes 87 are each provided with a loop 91 suitably secured to the tape, as by stitching. Each of the pins 59 on deployment projectiles 49 extend through a different one of the loops 91. Thus, the pins 59 and loops 91 serve to hold the expansible upper portion of the canopy bag closed until deployment occurs.

*Line storage sleeve and disposition of suspension and arresting lines*

As they leave the periphery of the parachute canopy, the suspension lines 42 each extend between adjacent ones of loops 91 and thence through a bore at 92 in a different one of the deployment projectiles 49. See Fig. 7. For each of the projectiles 49, there is provided a short length of cord or tape 93 having one end stitched either to the corresponding suspension line or to the canopy at the periphery thereof and then passing through the bore 92 of such projectile and returning to form a loop, with the remaining end also stitched to the suspension line or to the canopy, in order to limit relative movement between the projectile and the suspension line.

From the projectiles 49, the suspension lines 42 extend downwardly outside of the canopy bag 37, as seen in Fig. 7. Since the suspension lines are much greater in length than the parachute assembly which is to be projected, and since it is essential that the suspension lines pay out freely during projection, the lines are folded upon themselves and nested in upright, open-topped pockets 94 provided on the outer surface of a line storage sleeve 95 which surrounds bag 37. As best seen in Fig. 7, sleeve 95 is equipped with two groups of the pockets 94, each group including six circumferentially spaced pockets, the two groups being diametrically opposed across the assembly, as shown. Considering that both groups of the pockets 94 extend around the circumference of the canopy bag in the same direction, it can then be said that the two groups have first pockets 94a, 94b which are diametrically opposed across the canopy bag. Still assuming that the parachute canopy follows conventional form and is equipped with twenty-four suspension lines, the suspension lines are divided into two bundles of twelves lines each.

The arresting lines 77, four in number in this embodiment, each have one end attached to canopy bag 36 at the bottom thereof and extend upwardly between the canopy bag and sleeve 95. At the top of sleeve 95, the four arresting lines 77 are gathered into groups of two and each such group is combined with a different one of the two bundles of suspension lines.

Each such bundle is formed into a series of six dependent loops. The loops formed thusly are inserted downwardly into the groups of pockets 94, with the loops of one bundle being disposed in the pockets of one group and the loops of the other bundle being disposed in the pockets of the other group. For each bundle of lines, the loops nearest the deployment means 34 are inserted in a different one of the first pockets 94a, 94b. Where they emerge from the last pocket of the corresponding group of pockets, the suspension and arresting lines are attached to one of the buckles 96. Each buckle 96 is connected to a different one of the riser extension straps 7, Fig. 1, which straps extend from within the outer bag 97 later described, and thence to the pilot or other load to be recovered by the parachute.

From the foregoing, it will be noted that, during projection of the parachute assembly, the two bundles of suspension and arresting lines are always paying out from pairs of the pockets 94 which are aligned diametrically across the assembly. This assures that the payout of the lines will be even and that no rotational or tilting forces will be applied to the parachute assembly as the lines pay out.

At its bottom end, sleeve 95 is provided with an open mouth engaged under dependent flange 16 at the periphery of retaining ring 15, as best seen in Fig. 9. The bottom end portion of sleeve 95 is advantageously provided with an annular hem 98 in which is disposed a suitable draw cord 99, so that the open mouth at the bottom of the sleeve can be tightened under the dependent flange 16, as shown.

*Outer bag and top closure assembly*

Referring again to Fig. 2, it will be noted that the entire parachute assembly which is to be projected, and also the sleeve 95, are enclosed within fabric outer bag 97. At its lower end, bag 97 has an open mouth provided with an annular hem 100, Fig. 9, in which is disposed a suitable draw cord 101, whereby the bag is secured to the retaining ring 15 in the same manner just described with reference to the bottom end of sleeve 95.

The top closure assembly comprises a circular plate 102, Fig. 10, attached at its center to the cap screw 65 by a suitable screw 103 threaded into recess 103a, Fig. 5. The periphery of plate 102 is in the form of a dependent flange 104. Inwardly of flange 104 and secured to the bottom of plate 102 is a circular ring 105 having a dependent peripheral flange 106. The flange 106 extends first downwardly and then curves outwardly to provide a seat for an elastic retaining ring 107 disposed in an annular hem in the top of outer bag 97.

The two riser extension straps 7 extend from buckles 96 and thence through notches 106a in flange 106, as best seen in Fig. 11, and between the top of bag 97 and flange 104. In order that the straps 7 shall be held against withdrawal from the canopy bag prior to projection of the parachute assembly, there is stitched to each of the straps, at a point adjacent cover plate 102 and outside of the outer bag 97, a loop of cord or the like 108. On each side of the position to be occupied by the strap 7, there is stitched to the outer bag a similar loop 109. Each loop 109 extends through an opening 110 in cover plate 102 and terminates thereabove. A retaining cord 111 is run through all of the loops 108 and 109, so tying the straps to the cover plate. Cord 111 breaks under the force of projection of the parachute assembly, since the cover plate 102 of course travels with the projected assembly away from the bag, while the outer bag remains on the mount 8.

*Relation of projected assembly to projection means*

The projection tube 13, which is secured to mounting plate 11, is open at its upper end. The projected tube 33 is open at its lower end and is telescopically engaged over tube 13. The upper end of tube 33 is closed by the bottom wall of housing 67, it being noted that dependent portion 68 of the housing is threaded to the outer surface of the upper end of tube 33.

The bottom end portion of tube 33 is provided with an inwardly directed, transverse annular groove in which is retained an O-ring 112, Fig. 4, the inner periphery of the O-ring engaging the outer surface of stationary tube 13 to provide an effective seal between the two tubes. Thus, the explosion gases escaping through perforations 21 of combustion chamber 20 are trapped within the telescoped tubes 13, 33, and their expansion results in an abrupt projection of tube 33 away from the mount.

At this point, it should be kept in mind that the outer protective bag 97 and the sleeve 95 remain behind with the stationary components of the device, since the bottom ends of this bag and the sleeve are attached to flange 15. The assembly illustrated in Fig. 3 is projected and, as this assembly travels away from the mount, the suspension lines 42 and arresting lines 77 pay out freely from the pockets 94 of sleeve 95.

*Relative length of suspension and arresting lines*

In order that the arresting lines 77 shall serve to decelerate the projected assembly, and thus cause plunger 71 to actuate deployment means 34, the arresting lines are made effectively shorter than the suspension lines. Thus, consider that the device is assembled in the manner shown in Fig. 3 but that tube 33 has not yet been applied to tube 13. Consider further that such assembly is suspended from its top, with both the suspension lines and the arresting lines dangling free, buckles 96 having not yet been attached. With equal weight applied to the suspension and arresting lines, the latter are then cut to be nine inches shorter than the suspension lines, assuming the suspension lines to have the usual length for a conventional twenty-four foot parachute canopy.

Because of this difference in length, it is obvious that, during the flight of the projected assembly, the arresting lines 77 will become taut while the suspension lines are still somewhat slack. As the arresting lines become taut, the entire projected assembly is caused to straighten in its line of flight, since the outer ends of the arresting lines are attached to the bottom portion of the canopy bag, below the center of gravity of the projected assembly.

The arresting lines are made of extensible material, advantageously nylon. Since the projected flight of the parachute assembly is rapid, and the mass thereof considerable, the extension lines stretch after they become taut. Thus, as the projected assembly decelerates, lines 77 stretch. In actual operation with a typical embodiment of the invention, this stretching action is sufficient to allow suspension lines 42 also to become taut, so that the rate of deceleration is increased.

*Operation*

Assume that the parachute is fully assembled as shown in Fig. 2 and is mounted on an aircraft, as in Fig. 1. Assume further that circumstances are such that the parachute must be used at a time when the aircraft is close to the ground, so that the free fall time necessary to fill a conventional parachute is not available.

To initiate the operation, the pilot need only pull Bowden wire 4, withdrawing the end thereof from actuator sleeve 25 and the peripheral groove in firing pin actuator 29. Spring 30, heretofore compressed, is now released to drive the firing pin actuator against firing pin 28 which in turn strikes primer 23a, causing the same to explode. Explosion of primer 23a in turn ignites the explosive charge in container 23. The expanding gases so produced are suddenly released into the interior of combustion chamber 20, by deformation of metal plate 31, and pass outwardly through perforations 21 into the upper portion of projection tube 13.

Since the upper end of tube 33 is closed, and since a seal is provided between tube 33 and tube 13 by the O-ring 112, the pressure within projection tube 13 is effective to project the parachute assembly away from its mount in the axial direction of tube 13.

As soon as tube 33 is urged upwardly by explosion of the projection charge, shear pin 84 is ruptured, freeing the upper tip portion of latch rod 83 from portion 68 of housing 67. The latch rod is retained on mounting plate 11 by reason of its engagement with latch plate 18. The tip of latch rod 83 having been withdrawn from its engagement with shoulder 81, latch pin 78 is urged outwardly by spring 80, so that its inner tip is no longer engaged in groove 82 of plunger 71. Thus, plunger 71 is free to be actuated upon deceleration of the projected assembly.

Initial upward movement of the project assembly also ruptures retaining cords 111, so freeing riser extension straps 7. Also, the top of outer bag 97 is withdrawn from its engagement with dependent flange 106, freeing the outer bag from the top cover assembly. Outer bag 97 and sleeve 95, having their bottoms attached to flange 15 by their respective draw cord arrangement, remain on the stationary structure. Since the suspension lines are attached to projectiles 49, and the arresting lines are attached to the canopy bag 37, the suspension lines and the arresting lines pay out of the pockets 94 of sleeve 95 as the projected assembly continues its flight away from mounting structure 8.

The projected flight of the parachute assembly continues at high speed until the arresting lines are completely payed out of pockets 94 and the combination of the riser extension straps 7 and the arresting lines 77 becomes taut, it being understood that the riser extension straps 7 are attached to the pilot and that the projected flight of the parachute assembly is away from the pilot. Tautening of the arresting lines and the straps to which they are attached causes deceleration of the projected assembly. Since the arresting lines are attached to the lower portion of the canopy bag, the projected assembly is caused to straighten up in flight, so eliminating any tilt which may have occurred. In this connection, it is to be noted that the center of gravity of the projected assembly lies at a point approximately at the bottom wall of housing 67. The projected assembly, through decelerating, continues to move, stretching arresting lines 77 until suspension lines 42 also become taut. Since the suspension lines 42 are also somewhat extensible, some continuation of the projected flight still occurs.

The actuating means 35 is advantageously so designed as to operate in response to the deceleration force existing at the time when the arresting lines have stretched sufficiently to allow the suspension lines also to become taut. When this occurs, the momentum of plunger 71 becomes sufficient to completely overcome the biasing effect of radially disposed springs 76. Plunger 71 hence moves upwardly until tubes 73, 74 have been sufficiently pivoted to bring the springs 76 above the horizontal. At this point, plunger 71 is free to snap upwardly, with the full force of its momentum, into contact with firing pin 64, so actuating the same to explode primer 62 of the deployment charge.

Explosion of primer 62 ignites the explosive charge within container 61 and the resulting explosion gases bend the lower portion of the cylindrical wall of that container outwardly into engagement with the frustroconical lower portion 46 of the deployment charge chamber 45. The explosion gases are thus suddenly released into conduits 48 and applied against the tips of stems 51 of projectiles 49. Such abrupt application of radially outward force to the projectiles ruptures the shear wire 57, so freeing the deployment projectiles. The projectiles 49 are accordingly projected radially outward at high speed, carrying the suspension lines therewith and therefore deploying the parachute canopy 36.

It should be noted that deployment of the canopy occurs at a time when suspension lines 42 have also become taut, so that, while the tube 33 and its associated parts still move, because of the extensibility of lines 42, 77, such movement is greatly limited. In other words, considering the relatively high speed of the initial projected flight, the assembly has been brought to a virtual standstill at the time the deployment charge is ignited. Such timing is important and advantageous, because continued movement of tube 33 after actuation of the deployment means 34 will tend to cause a "coning effect" which opposes outward flight of the deployment projectiles. The relationship just described between arresting lines 77, suspension lines 42 and actuator 35 serves to minimize such continued movement, thereby minimizing the "coning effect" and taking maximum advantage of the momentum of the deployment projectiles. As a result of this, it is possible to have the canopy assume, at the instant after deployment, a configuration approximating a hemisphere.

As the projectiles 49 begin to move outwardly, lower pins 59 thereof are withdrawn from the holes in which they have been seated in flanges 54 and 60. The loops 91 attached to the upper ends of tapes 87 are accordingly freed. Thus, the tapes 87 unfurl, completely and instantaneously opening the upper portion of the canopy bag so that deployment of the canopy can proceed without hinderance. Immediately after the freeing of loops 91 from pins 59, the entire canopy bag 37 is stripped from the canopy. This occurs because the canopy bag is secured to the now-taut and extended arresting lines 77, while these parts of the assembly carried by tubes 33 are still moving upwardly with that tube. Since the lines 77 are of nylon, they are somewhat resilient as well as extensible. The resilient feature of the lines, therefore, helps to shorten the time required to strip the bag 37 from the canopy. In an extremely short time after explosion of the deployment charge, the canopy 36 is fully deployed and the suspension lines 42 are taut. When the canopy has been fully deployed, the apex plate 39 is of course still in place, so that tube 33 remains connected to the canopy, the entire assembly of tube 33, deployment means 34, actuator 35 and top cover assembly 38 remain with the canopy and are thus recovered after use of the parachute. Arresting lines 77 of course remain connected between buckles 96 and the canopy bag 37, so that the canopy bag and arresting lines dangle from buckles 96 during descent of the parachute and its load.

Employing parachutes constructed in accordance with the embodiment illustrated in Figs. 2–11, projection flight times of 0.3–0.4 second, and deployment times of 0.2 second, have been attained. Thus, the load is suspended from the deployed canopy within 0.5–0.6 second after Bowden wire 4 is operated.

I claim:
1. In a power projected and deployed parachute, the combination of a projected assembly comprising a support member, a parachute canopy disposed in folded relation on said member, deployment means mounted on said member and operatively associated with said canopy to deploy the same, and inertia operated actuating means operatively associated with said deployment means to actuate the same to deploy said canopy; projecting means operatively associated with said projected assembly to project the same, and means attached to said projected assembly and effective to decelerate the same at a given point in its projected flight to cause operation of said inertia operated actuating means.

2. A power projected and deployed parachute in accordance with claim 1 wherein the means for decelerating the projected assembly includes at least one arresting line attached at one end to said projected assembly, the other end of said arresting line being attachable to an object other than the projected assembly, whereby said assembly is decelerated when the said arresting line becomes taut.

3. A power projected and deployed parachute in accordance with claim 2 and wherein said projected assembly includes a canopy retaining container, said one end of said arresting line being attached to said container.

4. A power projected and deployed parachute in accordance with claim 3 and wherein a portion of said container extends, with respect to the direction of projected flight of said assembly, rearwardly of the center of gravity of said assembly, said one end of said arresting line being attached to said portion.

5. A power projected and deployed parachute in accordance with claim 2 and including at least two arresting lines, the points of attachment thereof to said projected assembly being diametrically opposed transversely of the assembly.

6. A power projected and deployed parachute in accordance with claim 1 and wherein said supporting member is an elongated member having leading and trailing end portions, said deployment means being mounted on said member at said leading end portion and said means effective to decelerate the assembly being attached to the assembly adjacent the trailing end portion of said member.

7. A power projected and deployed parachute in accordance with claim 6 and wherein said canopy is disposed with the periphery thereof adjacent said deployment means and with the apex thereof disposed at a point spaced along said member from said deployment means.

8. A power projected and deployed parachute in accordance with claim 1 and including line storing means disposed outwardly of said projected assembly and attachable to an object other than the projected assembly, said line storing means comprising a series of peripherally spaced pockets opening in the direction of travel of said projected assembly, said canopy being equipped with a plurality of suspension lines, said lines being arranged in loops each stored in one of said pockets.

9. A power projected and deployed parachute in accordance with claim 8 and wherein said line storing means is a sleeve through which said projected assembly extends, said sleeve being provided with two series of said pockets, said suspension lines being grouped into a plurality of bundles, each of said series of pockets containing a different one of said bundles.

10. A power projected and deployed parachute in accordance with claim 1, wherein said projecting means includes means for mounting the same on a support, said parachute further comprising a generally tubular outer enclosure and means securing one end of said enclosure fixedly with respect to such support, the other end of said enclosure being releasably connected to said projected assembly.

11. A power projected and deployed parachute in accordance with claim 1 wherein said support member is an elongated member having leading and trailing end portions and said projecting means comprises a stationary projection tube telescopically associated with said support member, said combination further comprising a generally tubular outer enclosure and closure means therefor, said closure means being mounted on said projected assembly at the leading end portion of said support member, one end of said enclosure being releasably connected to said closure means and the other end of said enclosure being fixedly connected to said projection tube.

12. A power projected and deployed parachute in accordance with claim 1 wherein said projecting means comprises a stationary first tube, said support member is an elongated second tube having open leading and trailing ends, said second tube being telescopically engaged with the first, said actuating means comprising a housing mounted on the leading end of said second tube and including a transverse wall closing said leading end, and said projecting means includes means for generating a suddenly increasing pressure within the telescopic assembly of said first and second tubes.

13. A power projected and deployed parachute in accordance with claim 1 and wherein said support member, said deployment means and said actuating means constitute a unitary assembly and said canopy is attached at its apex to said support member.

14. In a fast acting parachute, the combination of a projected assembly comprising a support member; a canopy disposed on said member in folded relation; deployment means including a plurality of deployment projectiles connected to the periphery of said canopy, explosive means for projecting said projectiles radially outward of said member to deploy said canopy, and inertia-operated actuating means operatively associated with said explosive means to actuate the same to deploy said canopy; projecting means operatively associated with said projected assembly to project the same; and means attached to said assembly and effective to decelerate the same, to cause operation of said actuating means, at a given point in its projected flight and only so long as said deployment projectiles remain unprojected.

15. A parachute in accordance with claim 14 comprising a canopy-retaining enclosure having an open end releasably connected to said deployment projectiles, and said means attached to said assembly and effective to decelerate the same comprises at least one arresting line attached to said enclosure.

16. In a fast acting parachute, the combination of a projected assembly comprising a support, a parachute canopy disposed in folded relation on said support, explosive deployment means mounted on said support and operatively associated with said canopy to deploy the same, inertia-operated actuating means operatively associated with said deployment means to actuate the same, and canopy retaining means having an expansible top portion, said deployment means including means engaged with said expansible top portion to retain the same prior to deployment of the canopy and to free the same at the instant of deployment; power means operatively associated with said projected assembly to project the same, the deployment means of said projected assembly being disposed at the end of said assembly which leads during flight and said canopy retaining means comprising a portion disposed at the end of said assembly which trails during the projected flight of the assembly; and means for substantially simultaneously decelerating said projected assembly, to operate said actuating means, and stripping said retaining means from the canopy, said means for decelerating said projected assembly and stripping said retaining means including at least one arresting line attached to said portion of said retaining means disposed at the end of said assembly which trails during the projected flight of the assembly.

17. In a fast acting parachute, the combination of a projected assembly comprising a support member, a parachute canopy disposed in folded relation on said member, deployment means mounted on said member and comprising a plurality of deployment projectiles connected to the periphery of said canopy and explosive means operative to project said deployment projectiles radially outward to deploy the canopy, means carried by said support member for actuating said deployment means during the projected flight of said projected assembly, and a canopy retaining bag having an expansible mouth portion disposed adjacent said deployment means and retained against expansion by said deployment means; and projecting means operatively associated with said assembly to project the same.

18. A parachute in accordance with claim 17 and wherein said expansible mouth portion comprises a plurality of tapes, said tapes being connected at their ends spaced from said deployment means to the remainder of said bag.

19. A parachute in accordance with claim 17 and wherein said expansible mouth portion comprises a plurality of tapes having free end portions adjacent and releasably connected to said deployment means.

20. A parachute in accordance with claim 17 and wherein said expansible mouth portion comprises a plurality of tapes having free end portions adjacent said deployment means, a plurality of said end portions each being provided with an opening engaged with said deployment means to retain said mouth portion against expansion only when the deployment means is not actuated.

21. A parachute in accordance with claim 17 and wherein said expansible mouth portion comprises a plurality of tapes having end portions adjacent said deployment means and loops each secured to a different one of said end portions; a plurality of said deployment projectiles each being provided with a pin, each pin of such projectiles passing through at least one of said loops to retain said mouth portion against expansion, said pins being withdrawn from said loops upon projection of said deployment projectiles.

22. A parachute in accordance with claim 17 and wherein the expansible mouth portion comprises a plurality of flexible, elongated elements having free end portions adjacent said deployment means, a plurality of said end portions each being provided with an opening operatively associated with said deployment means to retain said mouth portion against expansion so long as the deployment means is not actuated.

References Cited in the file of this patent

FOREIGN PATENTS

| | | |
|---|---|---|
| 19,059 | Great Britain | Aug. 20, 1914 |
| 133,924 | Austria | June 26, 1933 |
| 425,222 | France | June 6, 1911 |
| 436,529 | France | June 25, 1912 |